Patented Aug. 22, 1939

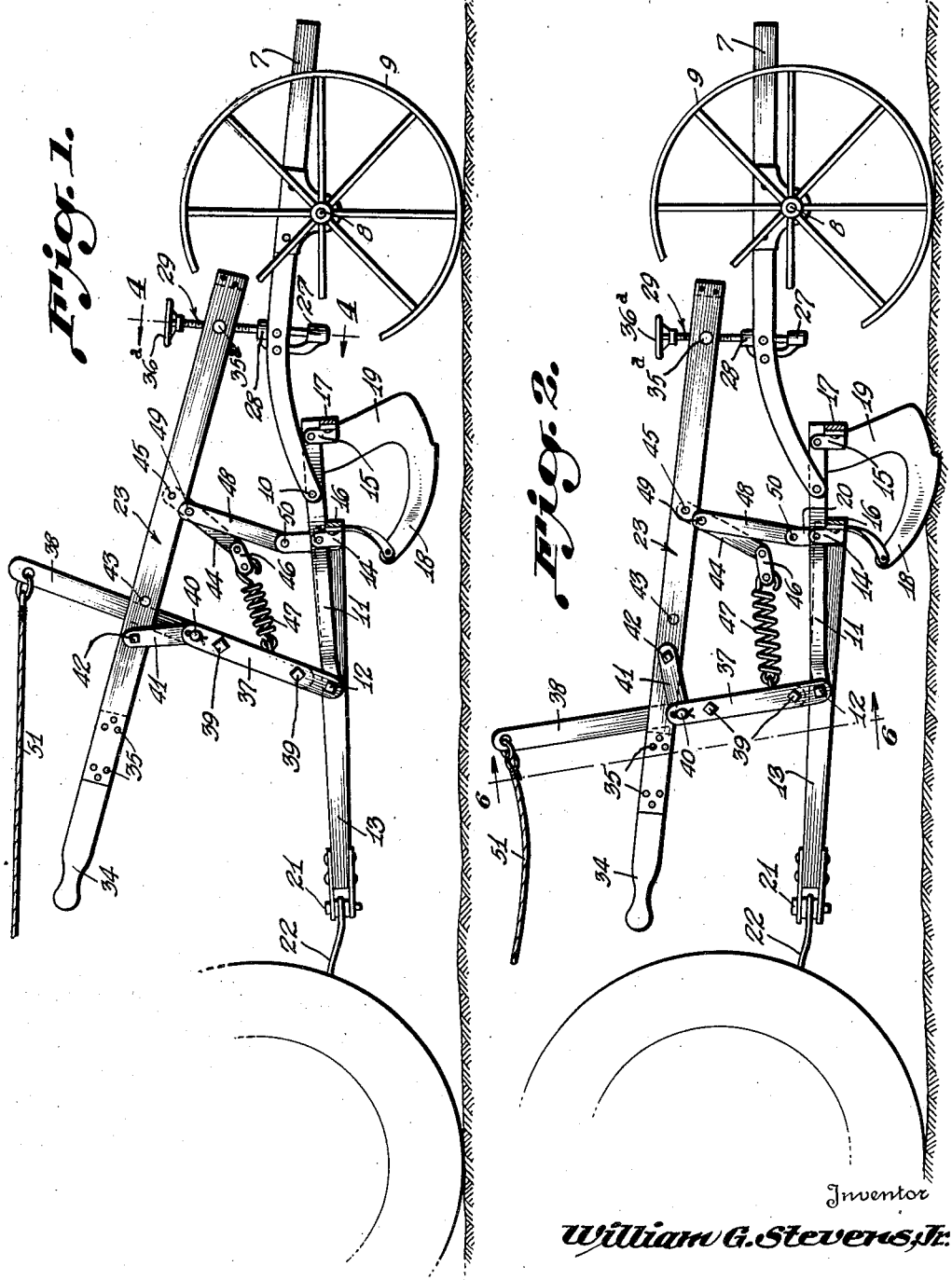

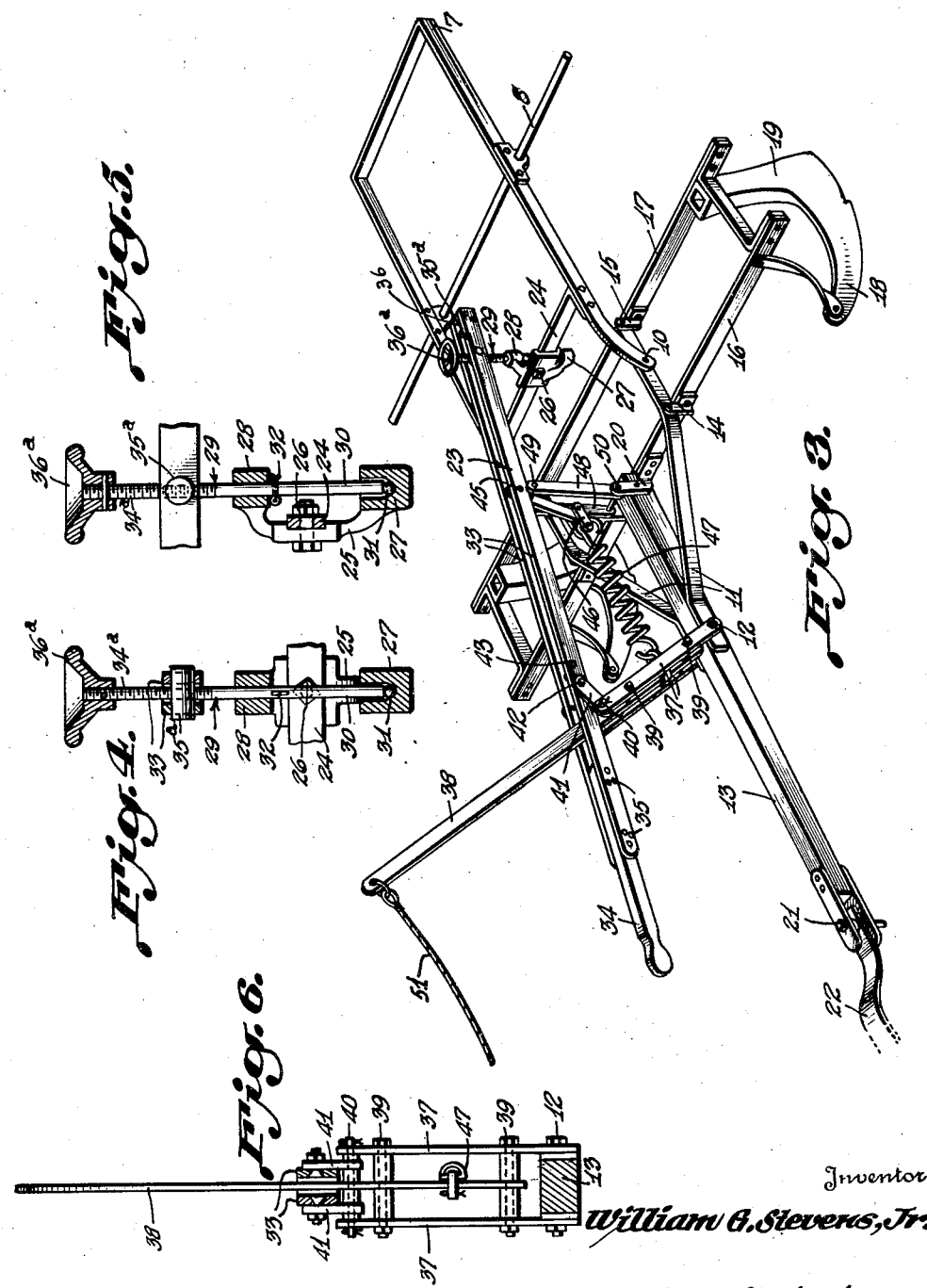

2,170,490

UNITED STATES PATENT OFFICE 2,170,490

MEANS FOR ELEVATING AND LOWERING PLANTER RUNNERS

William G. Stevens, Jr., Sykesville, Md.

Application October 24, 1938, Serial No. 236,771

20 Claims. (Cl. 97—236)

This invention relates to a mechanism to enable the driver of a tractor to raise and lower the runners of a towed corn planter or the like, and the present invention pertains more particularly to improvements in the mechanism disclosed in my Patent No. 2,128,860, dated August 30, 1938.

The primary object of the invention is to simplify the mechanism disclosed in my above patent, and to make it relatively easy for the operator of the tractor to take care of the raising and lowering of the runner structure of the planter.

Another object is to supply such mechanism with novel means for regulating or controlling the depth to which the runners penetrate the ground.

A still further object is to supply a simple mechanism for the intended purpose, and including a single spring which will serve first to balance the structure; second to keep the manually operated lever under tension; and third, function as a shock absorber to cushion the fall of the runner structure when the latter is lowered.

Having now indicated in a general way the nature and purpose of the invention, I will proceed to a detail description thereof with reference to the accompanying drawings, in which I have illustrated a preferred embodiment, and in which—

Fig. 1 is a side elevation partly in vertical section of portions of a corn planter provided with my improvements, and shown with its tongue connected to the rear end portion of a motor driven tractor. In this view, parts unessential to an understanding of the invention are not illustrated, and the runners of the planter are shown in raised position.

Fig. 2 is a similar view with the runners in lowered position.

Fig. 3 is an isometric perspective with certain parts removed to facilitate illustration.

Fig. 4 is a fragmentary transverse vertical sectional view of a detail taken on the line 4—4 of Fig. 1.

Fig. 5 is a similar view of the structure shown in Fig. 4, but taken at right angles to the view in Fig. 4.

Fig. 6 is a fragmentary vertical sectional view of a detail, taken on the line 6—6 of Fig. 2.

Referring to the drawings, 7 designates the frame of a conventional corn planter which is mounted on an axle 8 supported by ground wheels 9.

The forward end of the frame is pivotally connected at 10 to bars 11 which have converging front end portions that are secured at 12 to the medial portion of a tongue or other suitable draft device 13.

The rear end portions of the bars 11 are rigidly secured by brackets 14 and 15 respectively to the front and rear bars 16 and 17 of the runner frame of the planter, the latter carrying conventional runners 18 and seed boots 19. The usual seed hoppers and means for controlling the feed of the seed are omitted to facilitate illustration.

Brackets 20 rigidly secure the rear end of the tongue 13 to the front bar of the runner frame, and the front end of the tongue is pivotally connected at 21 to a draft bar 22 of a tractor (not shown).

In accordance with my invention, a lifting lever 23 has its rear end (Fig. 3) adjustably connected to a cross bar 24 of the frame of the planter, so that the rear end of the lever may be raised or lowered to regulate the depth to which the runners 18 penetrate the soil in a manner hereinafter explained.

As best shown in Figs. 4 and 5, a bracket 25 is secured to the cross bar 24 by any suitable means such as a bolt 26, and this bracket has a bottom socket portion 27 and an upper sleeve 28. A substantially vertical rod 29 has a lower cylindrical portion 30 which rotates in the parts 27 and 28. The lower end of the rod rests on a ball thrust bearing 31 carried by the socket 27, and the rod is retained in position by a cotter pin 32 which extends through the rod and is arranged to abut against the lower end of the sleeve 28.

The lever 23 preferably consists of a pair of spaced strap metal bars 33 which are rigidly secured at their forward end portions to any suitable operating member such as a handle 34, the latter being secured to the bars immediately above the forward end portion of the tongue 13. The member 34 has its rear portion arranged between the bars 33 and rigidly secured thereto by any suitable means such as bolts 35. A spacing element 36 is secured between the rear ends of the bars. The rod 29 extends upwardly between the bars, and its upper portion is threaded, as shown at 34a, such threaded portion having threaded engagement with a fulcrum member or nut 35a pivotally connected to the bars 33 to permit the later to turn about a horizontal axis at the rear end portion of the lever 23. A hand wheel 36a is fixed to the upper end of the rod 29 for use in adjusting the fulcrum nut 35a relatively to the frame 7.

A pair of links 37 are pivotally connected to the medial portion of the tongue at the point 12, and are rigidly secured to a manually controlled lever 38 by any suitable means such as bolts 39. The lever extends upwardly between the bars 33 and is movable forwardly and backwardly about the pivot pin 12. The upper ends of the links 37 are pivotally connected by a cross pin 40 to another pair of links 41, the latter being pivotally secured at 42 to the lifting lever 23. When the manually operated lever 38 is in its forward position, as shown in Fig. 2, the cross pin 40 abuts against the lower edges of the bars 33 and limits the swinging movement of the links 41 in a clock-wise direction. When the lever 38 is in its rearmost position, it abuts against a pin 43 which joins the bars 33, and such pin limits the movement of the links 41 in a counter-clockwise direction.

Another link 44 depends from the lifting lever 23, rearwardly of the pin 43, and has its upper end portion arranged between the bars 33 and pivotally connected to the latter by a pin 45. Such link has its lower end pivotally connected to a short link 46. A coil spring 47 has its ends connected respectively to the lower end portion of the lever 38 and the link 46.

Another pair of links 48 have their upper ends connected to the medial portion of the link 44 by a pivot pin 49 which is adapted to abut against the lower edges of the bars 33 to limit the swinging movement of the link 44.

The lower ends of the links 48 are pivotally connected at 50 to upwardly projecting arms forming parts of the bracket 20.

It will be understood that the links 37 and 41 form a forward toggle structure, and that the links 44 and 48 form a rear toggle structure.

In operation, if we assume that the parts are in the positions shown in Fig. 2, the runner structure will be in lowered position for planting, and the forward portion of the handle 34 will be adjacent to the seat of the operator of the tractor. At such time, the spring 47 will serve to balance the structure. When it becomes necessary to elevate the runner structure, the operator reaches downwardly and catches hold of the handle 34, and then raises the front end portion of the lifting lever so as to swing the latter about the pivotal point 35a at the rear end portion of such lever. This causes the pivot pin 40 to move from a position forwardly of a straight line drawn through 12 and 42, to a position rearwardly of such line as indicated in Fig. 1, and after passing such line, the spring 47 comes into play and pulls the lever 38 into engagement with the stop pin 43, so that the spring from then on will act to hold the runner structure in raised position. Of course, as the lifting lever 23 is raised, the links 44 and 48 will function to raise the runner structure and to swing the tongue about the loose connection 21 where it is connected to the draft bar of the tractor.

In order to lower the runner structure, the lever 38 is moved forwardly about the axis 12, and this may be accomplished by using a control element such as a rope 51 which extends rearwardly from the tractor and has its rear end secured to the upper end of the lever 38. When the lever is moved forwardly, the spring 47 will function as a shock absorber and cushion the downward movement of the runner structure, because at such time the link 44 has a tendency to move in a counter-clockwise direction and to thus stretch the spring. The spring, as before stated, not only functions as a shock absorber, but always exerts a tension on the lever 38 and stabilizes the structure, whether the runners are in raised or lowered position.

In addition, the spring acts to balance the assembly so that it will not require any great degree of power to either raise or lower the runner structure.

It will be understood that the adjusting mechanism shown in Figs. 4 and 5, and which is arranged at the rear end portion of the lifting lever 23 is provided for the purpose of regulating the depth to which the runners 18 penetrate the ground. As shown in Fig. 2, if the hand wheel 36a is turned to decrease the distance between the rear end portion of the lever 23 and the frame 7 of the planter, the latter will fulcrum about the axle 8 so that the front end portion of the planter frame will move downwardly and turn on pins 10 to cause the runner structure to move downwardly. Of course, if the hand wheel is turned to increase the distance between the rear end of the lifting lever 23 and the planter frame, the opposite effect will be achieved.

From the foregoing it will be apparent that various designs or forms of operating members, such as the handle 34, may be used at the forward end of the lever 23 to meet the requirements of various makes of tractors with which the invention is to be employed, i. e., the invention contemplates a main lifting lever associated with a suitable operating member readily accessible to an operator on the driver's seat of the tractor.

The herein described and illustrated embodiments of the invention have given satisfactory results, and it will be manifest to those skilled in the art, from an understanding of the invention, that changes and modifications may be made without departing from the spirit and scope of the invention, and it is intended that all matters contained in the above description or shown in the drawings shall be interpreted as illustrative and not in a limiting sense.

What I claim and desire to secure by Letters Patent is:

1. The combination with a tractor, of a planter having a forwardly extending draft member connected to the rear end of the tractor, said planter having a main frame and a runner structure, said draft member being connected to said runner structure, an axle forming part of the planter, the main frame being pivotally mounted for movement about the axis of said axle, a lifting lever arranged above the draft member, extending along the latter and having an operating member at its front end arranged substantially above the front end of the draft member, means pivotally connecting the rear end portion of the lifting lever to the planter, means operatively connecting a medial portion of the lifting lever to the runner structure for use in lifting the latter when the lever is raised, and means arranged forwardly of the last mentioned means and cooperating with the lever for automatically locking the runner structure in raised position as soon as the lever is raised to a predetermined position.

2. The combination with a tractor, of a planter having a forwardly extending draft member connected to the rear end of the tractor, said planter having a main frame and a runner structure, said draft member being connected to said runner structure, an axle forming part of the planter, the main frame being pivotally mounted for movement about the axis of said axle, a lifting lever arranged above the draft member, extending along the latter and having an operating member at its front end arranged substantially above the front end of the draft member, means pivotally connecting the rear end portion of the lifting lever to the planter, means operatively connecting a medial portion of the lifting lever to the runner structure for use in lifting the latter when the lever is raised, and means arranged forwardly of the last mentioned means and cooperating with the lever for automatically locking the runner structure in raised position as soon as the lever is raised to a predetermined position, the automatic locking means comprising toggle links and a spring.

3. The combination with a tractor, of a planter having a forwardly extending draft member connected to the rear end of the tractor, said planter having a main frame and a runner structure, said draft member being connected to said runner structure, an axle forming part of the planter, the main frame being pivotally mounted for movement about the axis of said axle, a lifting lever arranged above the draft member, extending along the latter and having an operating member at its front end arranged substantially above the front end of the draft member, means pivotally connecting the rear end portion of the lifting lever to the planter, means operatively connecting a medial portion of the lifting lever to the runner structure for use in lifting the latter when the lever is raised, means arranged forwardly of the last mentioned means and cooperating with the lever for automatically locking the runner structure in raised position as soon as the lever is raised to a predetermined position, and means connected to the rear end portion of said lever for adjustably regulating the depth to which the runners of the runner structure may penetrate the ground.

4. A planter comprising a wheel supported axle, a main frame mounted on said axle for movement about a horizontal axis, a runner structure operatively connected to the main frame, a tongue connected to the runner structure and projecting forwardly therefrom, a lifting lever having its rear end operatively connected to the main frame, said lever extending forwardly above the tongue and having an operating member arranged substantially above the front end of the tongue, means operatively connecting a medial portion of said lever to said runner structure for raising the latter, and means arranged forwardly of the connecting means and cooperating with the lever for automatically locking the runner structure in raised position after the front end of said lever has been raised to a predetermined position.

5. A planter comprising a wheel supported axle, a main frame mounted on said axle for movement about a horizontal axis, a runner structure operatively connected to the main frame, a tongue connected to the runner structure and projecting forwardly therefrom, a lifting lever having its rear end operatively connected to the main frame, said lever extending forwardly above the tongue and having an operating member arranged substantially above the front end of the tongue, means operatively connecting a medial portion of said lever to said runner structure for raising the latter, means arranged forwardly of the connecting means and cooperating with the lever for automatically locking the runner structure in raised position after the front end of said lever has been raised to a predetermined position, and adjustable means positioned at the rear end portion of the lever for regulating the depth to which the runner structure may penetrate the ground.

6. A planter comprising a wheel supported axle, a main frame pivotally mounted on said axle for movement about a horizontal axis, a runner structure operatively connected to the main frame, a tongue rigidly connected to the runner structure and projecting forwardly therefrom, a lifting lever having its rear end operatively connected to the main frame, said lever extending forwardly above the tongue and having an operating member arranged substantially above the front end of the tongue, means operatively connecting the medial portion of said lever to said runner structure for raising the latter, and means positioned between the connecting means and the front ends of the lever and tongue for automatically locking the runner structure in raised position after the front end of said lever has been raised to a predetermined position, the automatic locking means including a toggle structure and a spring.

7. A planter comprising a wheel supported axle, a main frame mounted on said axle for movement about a horizontal axis, a runner operatively connected to the front end portion of said frame, a tongue rigidly connected to the runner structure and projecting forwardly therefrom, a lifting lever having its rear end pivotally connected to the main frame at a point between said axle and the runner structure, said lever extending forwardly above the tongue and having an operating member arranged substantially above the front end of the tongue, means operatively connecting a medial portion of said lever to said runner structure for raising the latter and the rear end of the tongue, and means positioned forwardly of said connecting means and cooperating with the lever for automatically locking the runner structure in raised position after the front end of said lever has been raised to a predetermined position.

8. A planter comprising a wheel supported axle, a main frame mounted on said axle for movement about a horizontal axis, a runner structure operatively connected to the front end portion of said frame, a tongue rigidly connected to the runner structure and projecting therefrom, a lifting lever having its rear end pivotally connected to the main frame at a point between said axle and the runner structure, said lever extending forwardly above the tongue and having an operating member arranged substantially above the front end of the tongue, means operatively connecting a medial portion of said lever to said runner structure for raising the latter and the rear end of the tongue, and means positioned forwardly of said connecting means and cooperating with the lever for automatically locking the runner structure in raised position after the front end of said lever has been raised to a predetermined position, the last mentioned means including a toggle structure and a spring.

9. A planter comprising a wheel supported axle, a main frame mounted on said axle for movement about a horizontal axis, a runner structure operatively connected to the front end portion of said frame, a tongue rigidly connected to the runner structure and projecting forwardly therefrom, a lifting lever having its rear end pivotally connected to the main frame at a point between said axle and the runner structure, said lever extending forwardly above the tongue and having an operating member arranged substantially above the front end of the tongue, means operatively connecting a medial portion of said lever to said runner structure for raising the latter and the rear end of the tongue, means positioned forwardly of said connecting means and cooperating with the lever for automatically locking the runner structure in raised position after the front end of said lever has been raised to a predetermined position, and means for unlocking the last mentioned means comprising a manually actuated element extending forwardly from said automatic locking means.

10. A planter comprising a wheel supported axle, a main frame mounted on said axle for movement about a horizontal axis, a runner structure operatively connected to the front end portion of said frame, a tongue rigidly connected to the runner structure and projecting forwardly therefrom, a lifting lever having its rear end pivotally connected to the main frame at a point between said axle and the runner structure, said lever extending forwardly above the tongue and having an operating member arranged substantially above the front end of the tongue, means operatively connecting a medial portion of said lever to said runner structure for raising the latter and the rear end of the tongue, and means positioned forwardly of said connecting means and cooperating with the lever for automatically locking the runner structure in raised position after the front end of said lever has been raised to a predetermined position, said connecting means comprising a toggle structure.

11. A planter comprising a wheel supported axle, a main frame mounted on said axle for movement about a horizontal axis, a runner structure pivotally connected to the main frame and positioned forwardly of said axle, a tongue rigidly connected to the runner structure and projecting forwardly therefrom, a lifting lever having its rear end pivotally connected to the main frame at a point between said axle and the runner structure, said lever extending forwardly above the tongue and having an operating member arranged substantially above the front end of the tongue, pivotally connected links operatively connecting a medial portion of said lever to said runner structure for raising the latter and the rear end of the tongue, and means positioned forwardly of said links and cooperating with the lever and tongue for automatically locking the runner structure in raised position after the front end of said lever has been raised to a predetermined position.

12. A planter comprising a wheel supported axle, a main frame mounted on said axle for movement about a horizontal axis, a runner structure pivotally connected to the main frame and positioned forwardly of said axle, a tongue rigidly connected to the runner structure and projecting forwardly therefrom, a lifting lever having its rear end pivotally connected to the main frame at a point between said axle and the runner structure, said lever extending forwardly above the tongue and having an operating member arranged substantially above the front end of the tongue, pivotally connected links operatively connecting a medial portion of said lever to said runner structure for raising the latter and the rear end of the tongue, and means positioned forwardly of said links and cooperating with the lever and tongue for automatically locking the runner structure in raised position after the front end of said lever has been raised to a predetermined position, the last mentioned means including a toggle structure.

13. A planter comprising a wheel supported axle, a main frame mounted on said axle for movement about a horizontal axis, a runner structure pivotally connected to the main frame and positioned forwardly of said axle, a tongue rigidly connected to the runner structure and projecting forwardly therefrom, a lifting lever having its rear end pivotally connected to the main frame at a point between said axle and the runner structure, said lever extending forwardly above the tongue and having an operating member arranged substantially above the front end of the tongue, pivotally connected tongle links operatively connecting a medial portion of said lever to said runner structure for raising the latter and the rear end of the tongue, means positioned forwardly of said links and cooperating with the lever and tongue for automatically locking the runner structure in raised position after the front end of said lever has been raised to a predetermined position, the last mentioned means including a toggle structure, and a spring connecting such toggle structure to one of said toggle links.

14. A planter comprising a wheel supported axle, a main frame mounted on said axle for movement about a horizontal axis, a runner structure pivotally connected to said frame and arranged forwardly of said axle, a tongue connected to the runner structure and projecting forwardly therefrom, a lifting lever having its rear end pivotally connected to the main frame at a point between said axle and the runner structure for movement about a horizontal axis, said lever extending forwardly above the tongue and having an operating member arranged substantially above the front end of the tongue, a first link pivotally connected to a medial portion of the lever and depending from the latter, a second link having its upper end pivotally connected to the first link and its lower end pivotally connected to the runner structure for raising the latter and the rear end of the tongue when the forward end of said lever is raised, and means arranged forwardly of said links and cooperating with the lever for automatically locking the runner structure in raised position after the front end of said lever has been raised to a predetermined position.

15. A planter comprising a wheel supported axle, a main frame mounted on said axle for movement about a horizontal axis, a runner structure pivotally connected to said frame and arranged forwardly of said axle, a tongue connected to the runner structure and projecting forwardly therefrom, a lifting lever having its rear end pivotally connected to the main frame at a point between said axle and the runner structure for movement about a horizontal axis, said lever extending forwardly above the tongue and having an operating member arranged substantially above the front end of the tongue, a first link pivotally connected to a medial portion of the lever and depending from the latter, a second link having its upper end pivotally connected to the first link and its lower end pivotally connected to the runner structure for raising the latter and the rear end of the tongue when the forward end of said lever is raised, and means arranged forwardly of said links and cooperating with the lever for automatically locking the runner structure in raised position after the front end of said lever has been raised to a predetermined position, the last mentioned means including toggle links pivotally connecting the tongue and lever, and a spring connecting one of the toggle links to said first link.

16. A planter comprising a wheel supported axle, a main frame mounted on said axle for movement about a horizontal axis, a runner structure pivotally connected to said frame and arranged forwardly of said axle, a tongue connected to the runner structure and projecting forwardly therefrom, a lifting lever having its rear end pivotally connected to the main frame at a point between said axle and the runner structure for movement about a horizontal axis, said lever extending forwardly above the tongue and having an operating member arranged substantially above the front end of the tongue, a first link pivotally connected to a medial portion of the lever and depending from the latter, a second link having its upper end pivotally connected to the first link and its lower end pivotally connected to the runner structure for raising the latter and the rear end of the tongue when the forward end of said lever is raised, means arranged forwardly of said links and cooperating with the lever for automatically locking the runner structure in raised position after the front end of said lever has been raised to a predetermined position, and means for unlocking the last mentioned means comprising a manually actuated element extending forwardly from said automatic locking means.

17. A planter comprising a wheel supported axle, a main frame mounted on said axle for movement about a horizontal axis, a runner structure pivotally connected to said frame and arranged forwardly of said axle, a tongue connected to the runner structure and projecting forwardly therefrom, a lifting lever having its rear end pivotally connected to the main frame at a point between said axle and the runner structure for movement about a horizontal axis, said lever extending forwardly above the tongue and having an operating member arranged substantially above the front end of the tongue, a first link pivotally connected to a medial portion of the lever and depending from the latter, a second link having its upper end pivotally connected to the first link and its lower end pivotally connected to the runner structure for raising the latter and the rear end of the tongue when the forward end of said lever is raised, toggle links arranged forwardly of said first and second links and cooperating with the lever for automatically locking the runner structure in raised position after the front end of said lever has been raised to a predetermined position, a second lever secured to one of said toggle links and projecting above the lifting lever, and a manually actuated element extending forwardly from the second lever for actuating the second lever to unlock the locking means.

18. A planter as claimed in claim 4, comprising a bracket secured to the main frame and provided with a sleeve and a socket disposed below the sleeve, a rod having a cylindrical portion rotatably mounted in said sleeve and socket, an anti-friction bearing in the socket supporting said rod, said rod having a threaded portion positioned above the sleeve, a member pivotally connected to the rear end portion of the lifting lever and having a threaded engagement with the threaded portion of the rod, and means for turning said rod.

19. A planter comprising a wheel-supported axle, a main frame mounted on said axle for movement about a horizontal axis, a runner structure operatively connected to the main frame, a tongue connected to the runner structure and projecting forwardly therefrom, a lifting lever, an upwardly and downwardly adjustable fulcrum member mounted on the main frame and to which the lever is pivotally connected, said lever extending forwardly above the tongue and having an operating member arranged substantially above the front end of the tongue, means operatively connecting a medial portion of said lever to said runner structure for raising the latter, and means cooperating with the lever for automatically locking the runner structure in raised position after the front end of said lever has been raised to a predetermined position.

20. A planter comprising a wheel-supported axle, a main frame mounted on said axle for movement about a horizontal axis, a runner structure operatively connected to the main frame, a tongue connected to the runner structure and projecting forwardly therefrom, a bracket mounted on the main frame, a threaded member rotatably mounted on the bracket, a fulcrum nut threadedly engaging the threaded member, a lever having its rear end portion pivotally connected to said fulcrum nut, said lever extending forwardly above the tongue and having an operating member arranged substantially above the front end of the tongue, means operatively connecting a medial portion of said lever to said runner structure for raising the latter, and means cooperating with the lever for automatically locking the runner structure in raised position after the front end of said lever has been raised to a predetermined posiiton.

WILLIAM G. STEVENS, Jr.